United States Patent [19]
Mou

[11] Patent Number: 6,086,496
[45] Date of Patent: Jul. 11, 2000

[54] ADJUSTING DEVICE

[75] Inventor: Michael Mou, Tu-Cheng, Taiwan

[73] Assignee: Dbtel Incorporated, Taipei Hsien, Taiwan

[21] Appl. No.: 09/184,442

[22] Filed: Nov. 2, 1998

[51] Int. Cl.[7] .............................. F16H 7/08; F16H 7/22
[52] U.S. Cl. ..................... 474/109; 474/111; 474/119
[58] Field of Search ................................. 474/109, 111, 474/119, 101, 253

[56] References Cited

U.S. PATENT DOCUMENTS

| | | | |
|---|---|---|---|
| 5,106,345 | 4/1992 | Moore et al. ............................ | 474/253 |
| 5,381,706 | 1/1995 | Yanusko et al. ........................ | 474/253 |
| 5,902,201 | 5/1999 | Vermeer et al. ........................ | 474/109 |

Primary Examiner—David A. Bucci
Assistant Examiner—Matthew A. Kaness
Attorney, Agent, or Firm—Rosenberg, Klein & Lee

[57] ABSTRACT

A belt tension adjusting device provided on a scanner transmission belt to adjust the tension of the transmission belt, includes a helical spring that helps maintain the tension of the transmission belt, a retaining post for fixing the position of the helical spring, and a toothed recess for connecting the scanner to the transmission belt.

2 Claims, 4 Drawing Sheets

ADJUSTING DEVICE

BACKGROUND OF THE INVENTION

1. Field of the Invention

The present invention relates to a belt tension adjusting device, and more particularly to a device for adjusting the tension state of a transmission belt for scanners so as to effectively adjust the transmission state of the belt, reduce costs, and increase competitiveness.

2. Description of the Prior Art

FIGS. 1A and 1B show two common ways of adjusting the tension of transmission belts of scanners. In FIG. 1A, a slide block pulley type is shown. It comprises a slide block 52, a spring 51, a belt 53, a carrier 54, and pulleys 55. FIG. 1B shows a rocker arm adjusting type, which includes an adjusting wheel 63, a spring 51, a belt 53, pulleys 55, a rocker arm 62, a carrier 54, a scanner frame 71, a glass surface 72, and a document 73. In both types as shown in FIGS. 1A and 1B, either slide blocks or rocker arms are required. This may cause damage to the belt, and the belt may become loosened, causing the transmission state of the transmission belt to slide during adjustment. Besides, the moving parts may wear, resulting in deflection of the tension of the transmission belt and defective transmission. In addition, there are numerous parts and components, which means increase in costs and reduction in competitiveness. All of these are problems that need to be solved.

SUMMARY OF THE INVENTION

The present invention relates to a belt tension adjusting device, and more particularly to a device for adjusting the tension state of a transmission belt for scanners so as to effectively adjust the transmission state of the belt, reduce costs, and increase competitiveness.

A primary object of the present invention is to provide a belt tension adjusting device to effectively adjust the transmission state of the transmission belt.

According to the primary object, the transmission belt tension adjusting device is provided on a transmission belt to adjust the tension of the transmission belt. The device comprises a helical spring having one end fixed on a fastening means and the other end urging against the transmission belt such that the transmission belt is maintained in a specific tension state. The fastening means is a scanner component frame connected to the transmission belt and includes a retaining post provided on the scanner component frame for retaining the helical spring so that the helical spring can be fixed on the fastening means; a fixed side having a toothed recess that engages with the transmission belt so that there is no relative displacement between the fastening means and the transmission belt; and a sliding side that maintains a sliding contact with the transmission belt so that there is relative displacement between the fastening means and the transmission belt. The transmission belt is a timing belt.

From the foregoing, it can be understood that the belt tension adjusting device of the present invention is a static adjusting type, which reduces use of parts and avoids damage to the belt and other problems of the prior art. In the present invention, the belt tension can be adjusted effectively and maintained. Besides, the present invention is compact in size, and has few parts and a simple construction. Costs can therefore be reduced to increase competitiveness.

BRIEF DESCRIPTION OF THE DRAWINGS

FIGS. 1A and 1B are schematic views of the prior art;

DETAILED DESCRIPTION OF THE PREFERRED EMBODIMENT

Figure 1A:
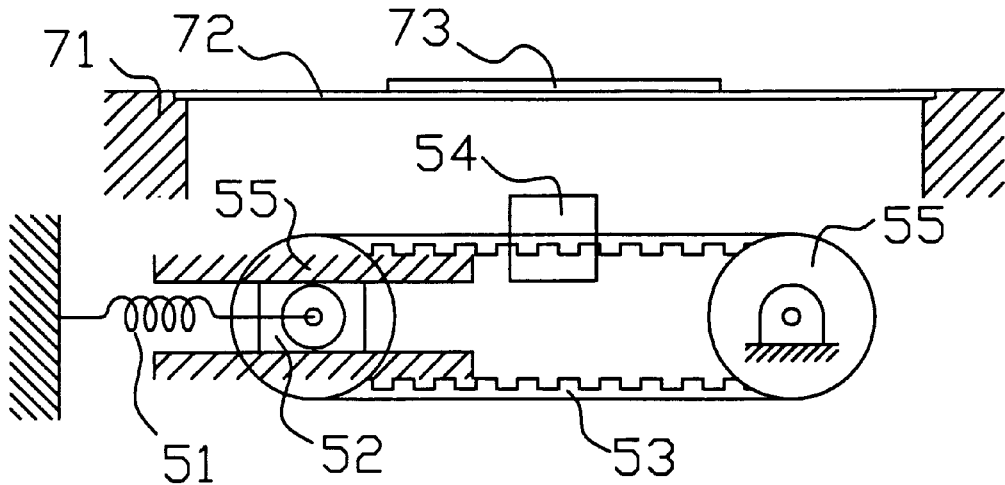
Figure 1A:
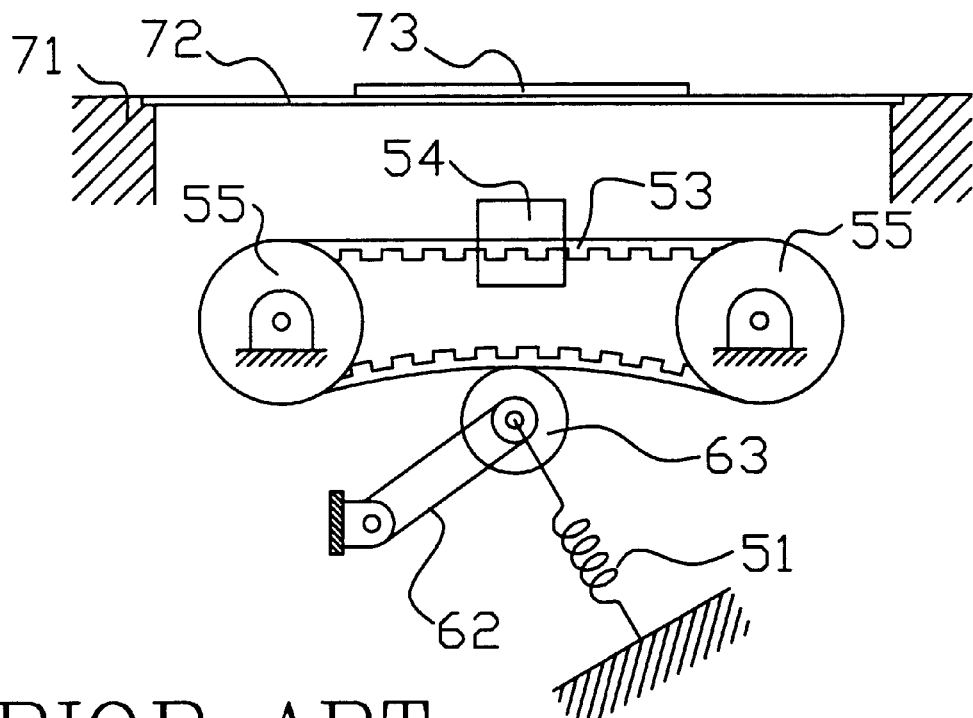
Figure 2:
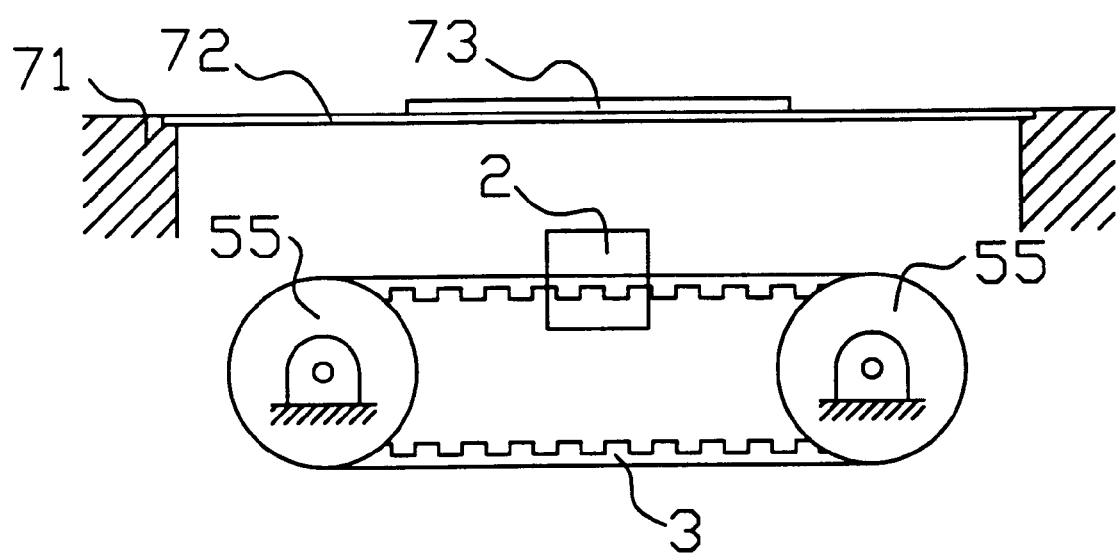
FIG. 2 is a schematic view of the structure of a preferred embodiment of the present invention.

Referring to FIG. 2, which is a schematic view of the structure of a preferred embodiment of the present invention, the present invention comprises a timing belt 3, a scanner component frame 2, pulleys 55, a scanner frame 71, a glass surface 72, and a document 73. The detailed structure of the scanner component frame 2 is illustrated in FIG. 3.

Figure 3:
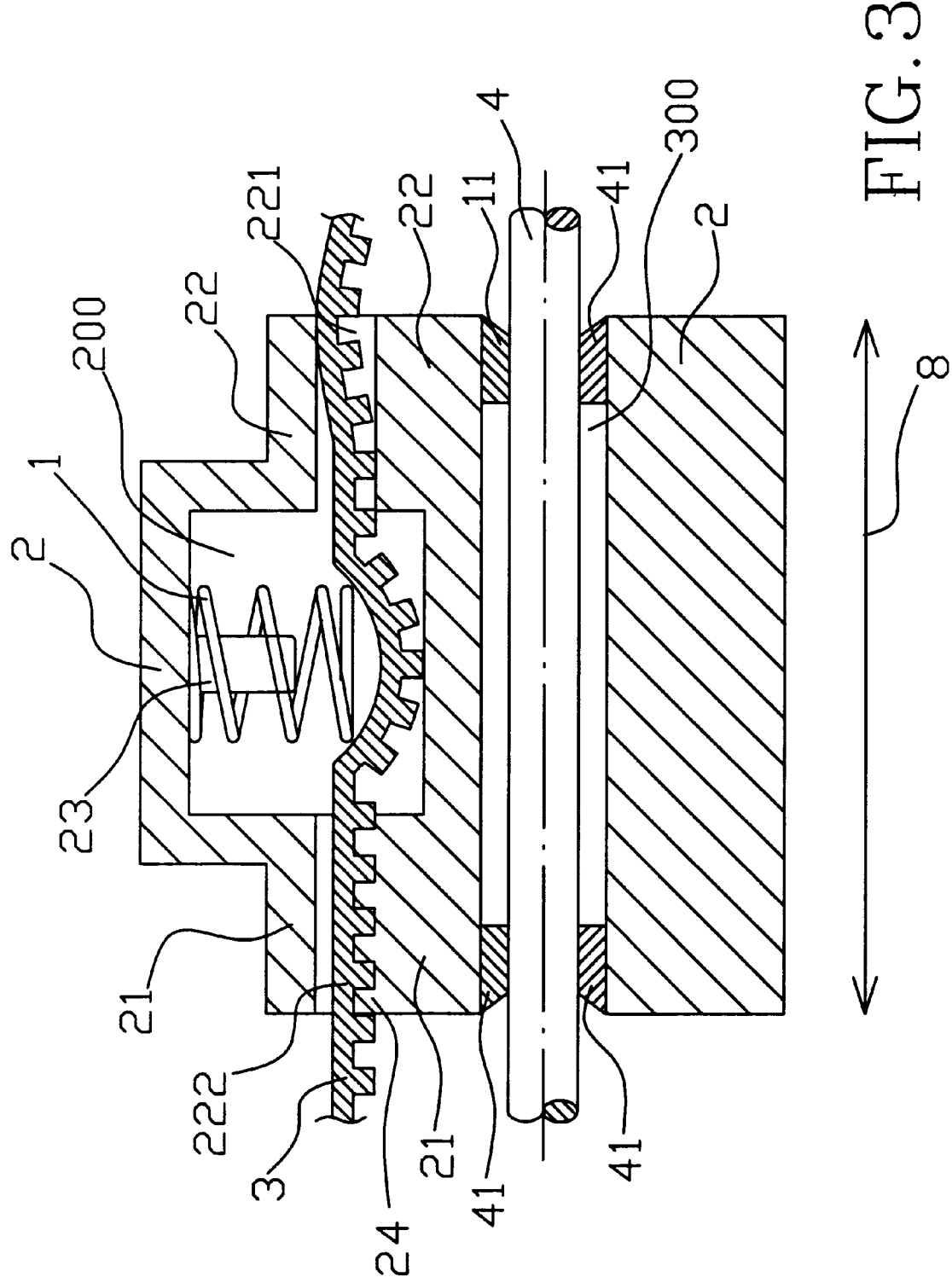
FIG. 3 is a schematic view illustrating operation of the preferred embodiment.
Figure 4:
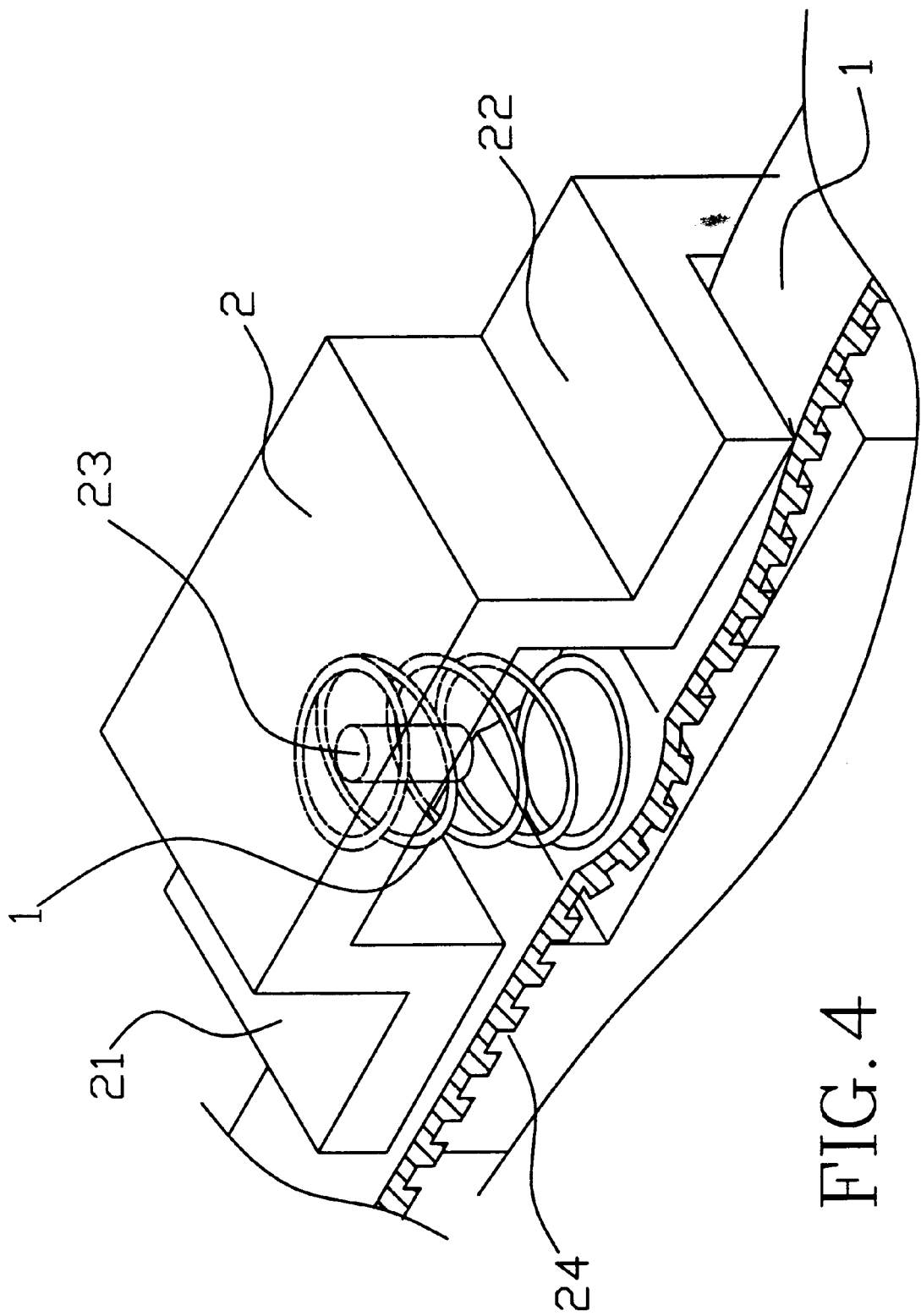
FIG. 4 is a perspective assembled schematic view of the preferred embodiment.

With reference to FIG. 3, the preferred embodiment of the present invention comprises a helical spring 1, the timing belt 3, the scanner component frame 2, a fixed side 21, a sliding side 22, a retaining post 23, a guide track 4, and a bearing 41. As shown, the helical spring 1 urges against the timing belt 3 and is secured in the scanner component frame 2 by means of the retaining post 23 to adjust the tension of the timing belt 3, so that the belt tension can be maintained in a specific tension state. The fixed side 21 is provided with a toothed recess 24 for engaging the timing belt 3 so that there is no relative displacement therebetween. The sliding side 22 is in a sliding contact with the timing belt 3, permitting relative displacement, so that the helical spring 1 can adjust the tension of the timing belt 3. The scanner component frame 2 may have a charge coupled device (CCD), lens and light source installed thereon. The pulleys 55 are driven by a driving device. By means of the transmission belt 3, the scanner component frame 2 can move along the guide track 44 in the movement directions 8.

From the foregoing, it can be understood that the belt tension adjusting device of the present invention is a static adjusting type, which reduces use of parts and avoids damage to the belt and other problems of the prior art. In the present invention, the belt tension can be adjusted effectively and maintained. Besides, the present invention is compact in size, and has few parts and a simple construction. Costs can therefore be reduced to increase competitiveness.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. An adjusting device, that is provided on a transmission belt to adjust the tension of said transmission belt, said device comprising:

a helical spring fixed to a fastening means at one end, and urging against said transmission belt at the other; and a fastening means, which is a scanner component frame secured on said transmission belt and includes a retaining post provided on said scanner component frame for retaining said helical spring so that said helical spring can be fixed on said fastening means;

a fixed side having a toothed recess for engaging said transmission belt so that there is no relative displacement between said fastening means and said transmission belt; and a sliding side maintaining a sliding contact with said transmission belt such that there is relative displacement between said fastening means and said transmission belt.

2. The adjusting device as claimed in claim 1, wherein said transmission belt is a timing belt.

* * * * *